(12) United States Patent
Coray

(10) Patent No.: US 6,499,922 B2
(45) Date of Patent: Dec. 31, 2002

(54) LOG DIVIDER

(76) Inventor: Terry Coray, 550 6$^{th}$ Ave. SW., Calgary, Alberta (CA), T2P 0S2

( * ) Notice: Subject to any disclaimer, the term of this patent is extended or adjusted under 35 U.S.C. 154(b) by 0 days.

(21) Appl. No.: 09/833,929

(22) Filed: Apr. 11, 2001

(65) Prior Publication Data

US 2002/0150438 A1 Oct. 17, 2002

(51) Int. Cl.$^7$ .................................................. B60P 7/08
(52) U.S. Cl. ............................ 410/37; 410/34; 410/42
(58) Field of Search .............................. 410/37, 32, 34, 410/36, 42; 280/143, 145, 404; 206/443

(56) References Cited

U.S. PATENT DOCUMENTS

| | | | | |
|---|---|---|---|---|
| 3,021,970 A | * | 2/1962 | Bigge et al. | 410/37 |
| 3,204,983 A | * | 9/1965 | Rehnstrom et al. | 410/37 |
| 3,409,157 A | * | 11/1968 | Lull | 410/37 |
| 3,637,235 A | * | 1/1972 | Karlin et al. | 410/37 |
| 5,964,557 A | * | 10/1999 | Eng | 410/37 |

* cited by examiner

*Primary Examiner*—Stephen T. Gordon
(74) *Attorney, Agent, or Firm*—Gene Scott-Patent Law & Venture Group

(57) ABSTRACT

A separating apparatus for use in hauling logs uses a pressure driven actuating device joined for actuating a pivoted boom adapted for moving from a vertical, log-loading, position on a log-hauling flat bed truck trailer, to a horizontal, log supporting, position. A boom cradle is adapted for receiving a terminal end of the pivoted boom when in the horizontal position. The actuating device, pivoted boom and boom cradle are adapted for engagement with the truck trailer for operation in loading, carrying and unloading logs.

4 Claims, 2 Drawing Sheets

LOG DIVIDER

BACKGROUND OF THE INVENTION

1. Field of the Invention

This invention relates generally to fixtures used in the transportation industry on trucks and rail cars for holding, supporting and segregating transported materials, especially bulk materials and more particularly to a hydraulically operated boom for use on a log hauler to separate logs into two portions for improved load-off.

2. Description of Related Art

In the trucking industry as applied to log hauling, a flatbed trailer is widely used for hauling logs. Such a trailer is built with fixtures along its sides for securing upright posts, spaced at an interval so as to contain loose logs laid onto the flat bed. This collection of from several to as much as one hundred logs are of different lengths, diameters and types, but all are positioned for hauling onto the flat bed and held there between the two rows of upright posts placed on either side of the flatbed. In order to facilitate the off-loading of the logs, which is accomplished by use of a grappling crane which must be able to get under the logs in order to lift them off the truck, a splitter log is commonly used. This log is placed on top of a first load of logs and oriented laterally across the flat bed trailer. Thus the logs placed on top of the splitter log are slightly separated from the lower, first placed logs, providing a space for the grappling crane to acquire leverage and position around the upper group of logs.

The prior art teaches the use of splitter logs for separating a lower and an upper group of logs to be hauled. However, splitter logs are not stable, are not necessarily of an ideal size, and are prone to breakage during transport. The present invention overcomes these problems and provides further related advantages as described in the following summary.

SUMMARY OF THE INVENTION

The present invention teaches certain benefits in construction and use which give rise to the objectives described below.

A separating apparatus for use in hauling logs uses a pressure driven actuating device joined for actuating a pivoted boom adapted for moving from a vertical, log-loading, position on a log-hauling flat bed truck trailer, to a horizontal, log supporting, position. A boom cradle is adapted for receiving a terminal end of the pivoted boom when in the horizontal position. The actuating device, pivoted boom and boom cradle are adapted for engagement with the truck trailer for operation in loading, carrying and unloading logs.

A primary objective of the present invention is to provide an apparatus and method of use of such apparatus that provides advantages not taught by the prior art.

Another objective is to provide such an invention capable of eliminating the use of separator logs.

A further objective is to provide such an invention capable of moving from a retracted position to an extended position.

A still further objective is to provide such an invention capable of supporting a load of logs in a rectangular stack and improving the loading balance on the transport vehicle.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

Figure 1:
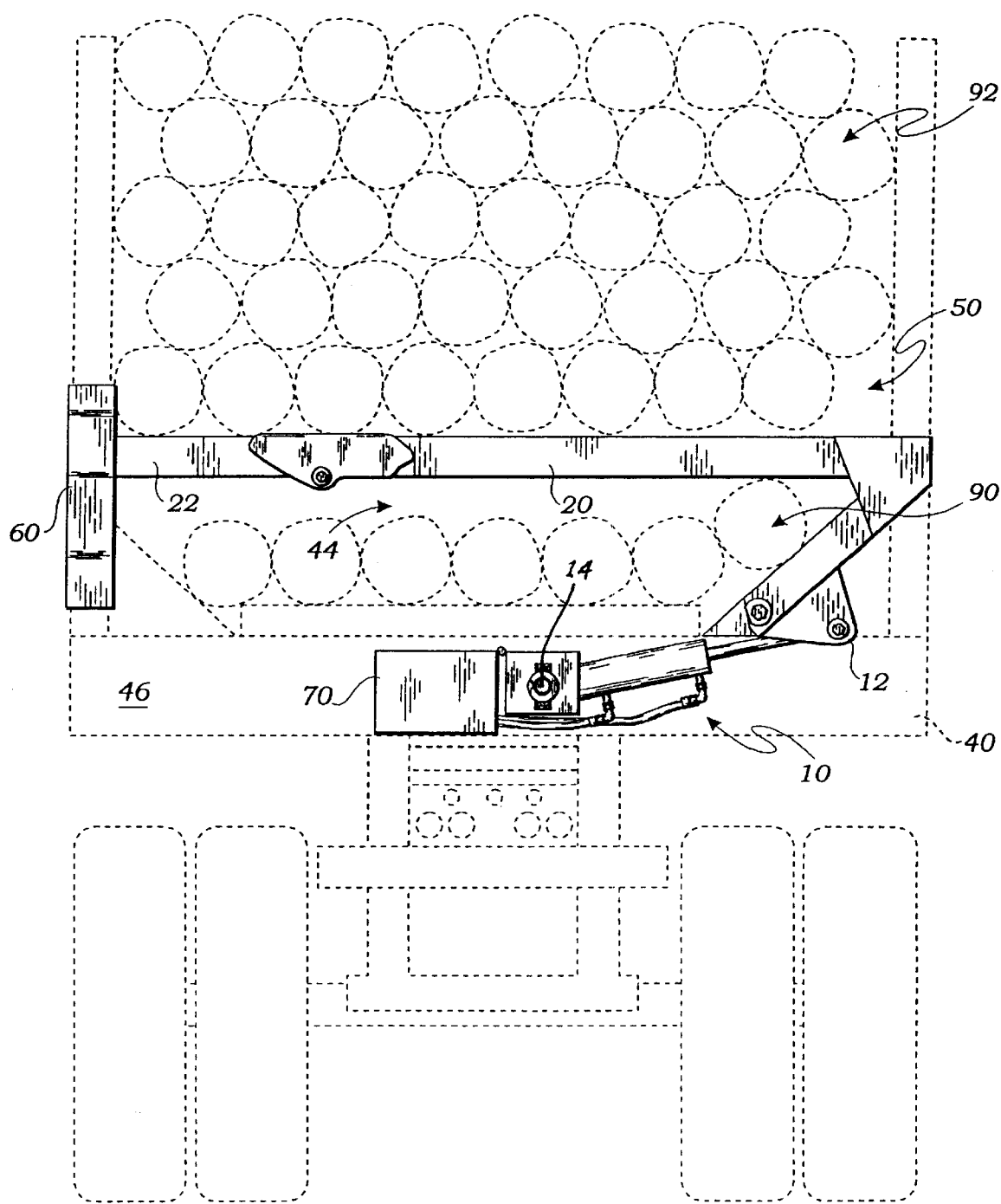
FIG. 1 is a rear elevational view of the present invention with a boom of the invention positioned in an extended, horizontal position for supporting a load.

The above described drawing figures illustrate the invention in at least one of its preferred embodiments, which is further defined in detail in the following description.

The present invention is a separating apparatus for use in hauling logs which comprises a pressure driven actuating means 10, preferably, a hydraulic ram assembly, joined for actuating a pivoted boom 20 adapted for moving from a vertical, log-loading, retracted position 30 on a log-hauling flat bed truck trailer 40, to a horizontal, extended, log supporting, position 50. A boom cradle 60 is adapted for receiving a terminal end 22 of the pivoted boom 20 when in the horizontal position 50. The actuating means 10, pivoted boom 20 and boom cradle 60 are adapted for engagement with the truck trailer 40 for operation on it and are, preferably, made an integral part of the trailer 40.

As shown, the apparatus further comprises a pivoted cover 70 for protecting a plurality of hydraulic lines 80 joined to the hydraulic ram assembly (actuating means 10) for its actuation. The pivoted boom 20 has a length "L" approximately equal to the width of the trailer 40. As can be seen, the cradle 60 is positioned on the opposing side of the trailer 40 as the pivot 24 of the boom 20.

Preferably, the boom 20, when extended into its horizontal position 50 is positioned above the surface 42 of the trailer flatbed. This results in a space 44 for a grappling head of a grabbling crane (not shown) to "get-under" the load of logs. Preferably, the present invention is mounted at the rear of the trailer 40 with the hydraulic ram assembly 10 mounted on the aft surface 46 of the trailer 10. Hydraulic lines 80 are then routed to a hydraulic accumulator and manual controls, which are located conveniently as desired and necessary for operation of the invention. As can be seen, the ram of the hydraulic assembly 10 is pivoted at a point 12 offset from the pivot 24 of the boom 20. This offset enables a relatively small linear excursion of the hydraulic ram (compare the position of point 12 in FIG. 1 with that of FIG. 2) to produce a full 90 angular degrees of motion of the boom 10. It should be noticed, too, that the ram is pivoted about point 14 so as to accommodate motion of the structure attached to boom 20.

Figure 2:
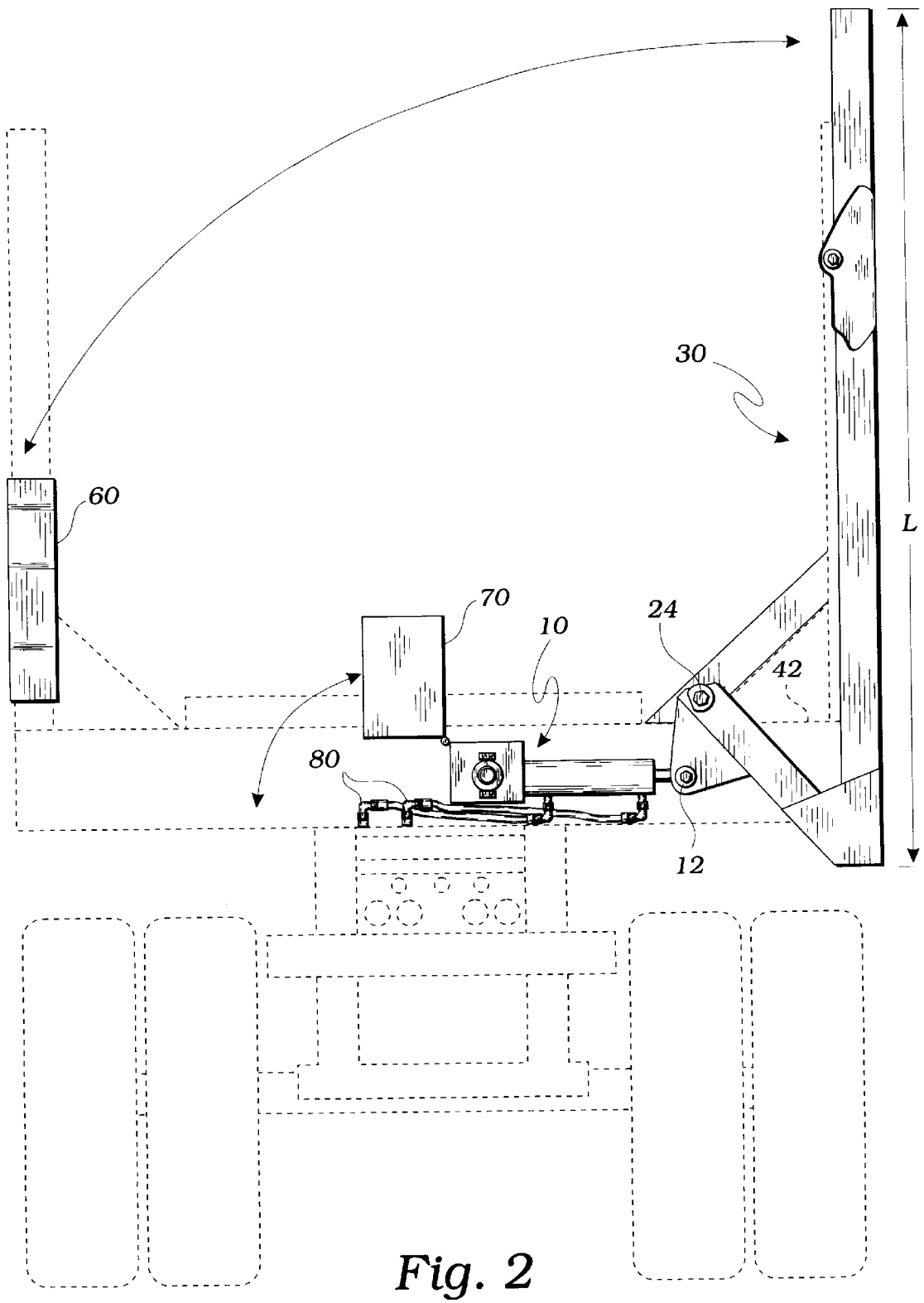
FIG. 2 is a rear elevational view thereof with the boom in an upright retracted position for enabling logs to be loaded onto flatbed of the trailer shown.

In use, the present invention apparatus is mounted onto the trailer 40 as shown in the figures. A first load of logs is deposited directly onto the flatbed surface 42 with the boom 20 in its vertical retracted position 30 as shown in FIG. 2. The boom 20 is now lowered to its extended position 50 as shown in FIG. 1, and engaged within the cradle 60 at its terminal end 22. Finally, a further larger load of logs 92 is set onto the boom 20 as shown. A space 44 is created between the two loads 90 and 92.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A separating apparatus for use in hauling logs which comprises a pressure driven actuating means joined for actuating a pivoted boom adapted for moving from a vertical, log-loading, position on a log-hauling flat bed truck trailer, to a horizontal, log supporting, position thereon, and a boom cradle adapted for receiving a terminal end of the pivoted boom when in the horizontal position, the actuating means, pivoted boom and boom cradle adapted for engagement with the truck trailer for operation therewith.

2. The apparatus of claim 1 wherein the pressure driven actuating means is a hydraulic ram assembly.

3. The apparatus of claim 2 further comprising a pivoted cover for protecting a plurality of hydraulic lines joined to the hydraulic ram assembly.

4. The apparatus of claim 3 wherein the pivoted boom has a length approximately equal to the width of a log-hauling truck trailer.

* * * * *